United States Patent [19]

Heidrich et al.

[11] E Patent Number: Re. 33,339

[45] Reissued Date of Patent: Sep. 18, 1990

[54] CHAIN FOR SUPPORTING ENERGY CONVEYING MEANS, AND CHAIN LINK THEREFOR

[75] Inventors: Klaus Heidrich, Siegen; Alfred Krewitt, Kreutzal; Kurt Loos, Dreis-Tiefenbach; Fritz Ipithan, Huttental-Weidenau, all of Fed. Rep. of Germany

[73] Assignee: Kabelschlepp Gesellschaft mit Beschrankter Haftung, Siegen, Fed. Rep. of Germany

[21] Appl. No.: 153,799

[22] Filed: May 27, 1980

Related U.S. Patent Documents

Reissue of:

[64] Patent No.: 3,664,619
Issued: May 23, 1972
Appl. No.: 49,347
Filed: Jun. 24, 1970

[30] Foreign Application Priority Data

Jun. 26, 1969 [DE] Fed. Rep. of Germany ..... 1932428

[51] Int. Cl.[5] ..... F16L 3/00

[52] U.S. Cl. ..... 248/51; 59/78; 248/49

[58] Field of Search ..... 248/51, 49; 59/78, 90, 59/91, 85

[56] References Cited

U.S. PATENT DOCUMENTS

| | | | |
|---|---|---|---|
| 1,335,302 | 3/1920 | Stout | 248/548 X |
| 2,589,914 | 3/1952 | Wolf | 59/78 X |
| 2,666,610 | 1/1954 | Nerman | 248/279 X |
| 2,938,329 | 5/1960 | Onulak . | |
| 2,975,807 | 3/1961 | Waninger | 248/49 UX |
| 2,980,976 | 4/1961 | Coulter | 248/221.4 X |
| 3,053,358 | 9/1962 | Gross . | |
| 3,064,795 | 11/1962 | Kaufer et al. . | |
| 3,095,753 | 7/1963 | Lengyel . | |
| 3,188,795 | 6/1965 | Ulm . | |
| 3,284,036 | 11/1966 | Nansel | 248/49 |
| 3,448,954 | 6/1969 | Kurlandsky . | |
| 3,503,579 | 3/1970 | Kurlandsky | 248/51 |
| 3,718,304 | 2/1973 | Schulz | 248/548 |

FOREIGN PATENT DOCUMENTS

| | | |
|---|---|---|
| 73365 | 7/1893 | Fed. Rep. of Germany . |
| 963077 | 4/1957 | Fed. Rep. of Germany . |
| 560438 | 9/1961 | Fed. Rep. of Germany . |
| 1126202 | 10/1962 | Fed. Rep. of Germany . |
| 1131964 | 12/1962 | Fed. Rep. of Germany . |
| 1281350 | 7/1969 | Fed. Rep. of Germany . |
| 1270041 | 7/1961 | France . |
| 34-21433 | of 1959 | Japan . |
| 40-13287 | of 1965 | Japan . |
| 36850 | 3/1907 | Switzerland . |
| 821182 | 9/1959 | United Kingdom . |
| 1069880 | 5/1967 | United Kingdom . |

*Primary Examiner*—J. Franklin Foss
*Attorney, Agent, or Firm*—Brumbaugh, Graves, Donohue & Raymond

[57] ABSTRACT

A chain for supporting energy conveying means, especially power lines and hoses, and a chain link therefor, according to which the chain links are of H-shape having two oppositely located laterally elastically yieldable arms interconnected by a transverse wall while two oppositely located arm sections of each link are provided with holes and the other two oppositely located arm sections of the same link are provided with studs having a diameter corresponding to a slide fit in said holes, the arrangement being such that the studs of one chain link pivotally engage the holes of the next following chain link.

22 Claims, 1 Drawing Sheet

CHAIN FOR SUPPORTING ENERGY CONVEYING MEANS, AND CHAIN LINK THEREFOR

Matter enclosed in heavy brackets [ ] appears in the original patent but forms no part of this reissue specification; matter printed in italics indicates the additions made by reissue.

The invention relates to supporting means in the form of a chain for conveying energy, fluid, and other substances to units moving along a track, in which the energy or the like conveying means are accommodated within spaces in a load-bearing chain. This chain comprises a number of links pivotally connected to each other and provided with stops for limiting the extent to which each link can swivel in relation to the adjacent links, each link comprising two side plates tied by a cross-piece or web.

Power-line supporting chains of this type are used, for example, with traveling machine tools, when electric, hydraulic or pneumatic power has to be fed to the tool. The power-line supporting chain is then usually supplied in the form of a self-supporting chain with links bearing stops to limit the relative pivotal movement between adjacent links. In most cases, the arrangement of the stops is such that the radius of curvature of the chain is infinitely great in one direction, so that the chain remains rigid when stretched out. In contrast thereto, the radius of curvature in the other direction has a finite value, so that the links of the chain can swivel to a chosen limited angle to one another, determined by the permissible radius of curvature of the least robust power line.

Various types of such power-line supporting chains are known, in which the individual links are joined together by hinge pins or by pivot sleeves. The hinge pins are secured in the plates by clips, clamps, or screw connections.

The design of the links for the known power-line supporting chains entails fairly heavy expenditure on precision work and production time. These links are invariably of a locked type such that whenever two adjacent links need to be taken apart, this can be done only with special tools. For large-sized supporting chains, such links are essential wherever long self-supporting spans are required. Hitherto, they have also been used for power-line supporting chains employed on lighter duties. With chains of this type, the precision work required has hitherto hindered production and prevented the chains from being freely used.

It is an object of the invention to provide a power-line supporting chain in which the links are joined together in such a way that the pivot connections can be made and released at any time, easily and without the use of special tools.

It is also an object of this invention to provide a supporting chain as set forth in the preceding paragraph which can be realized at a considerably lower cost in material and assembly work for the chain-link pivots than was heretofore possible.

Another object of the invention is to eliminate the difficulties and drawbacks inherent in the present state of the art.

These and other objects and advantages of the invention will appear more clearly from the following specification in connection with the accompanying drawings, in which.

Figure 2:
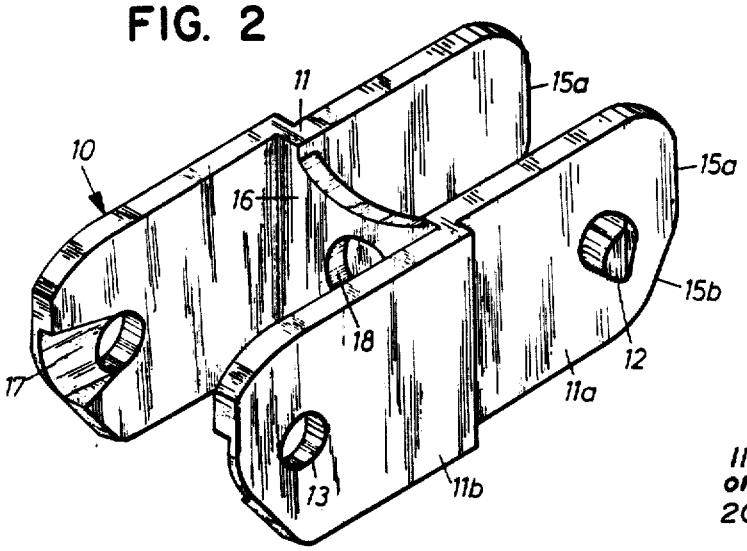
FIG. 2 is an isometric view of one type of link according to the invention.

The chain according to the invention for supporting energy conductors within one or more passages provided in a number of chain links having side plates with the side plates of one link pivoted to the corresponding side plate of the next adjacent link, and provided with bearing stops for limiting the extent to which each link swivels relative to the next adjacent link is characterized primarily in that the side plates of each link are tied together by a cross-piece intermediate the extremities of the link to allow the end portions of the side plates freedom to flex, while each of the side plates has one end portion provided with a stud while the opposite end portion is provided with a hole or depression corresponding in shape to the stud and into which the corresponding stud of the next adjacent link can be pushed.

This design results in a link that is particularly easy to manufacture. The studs and recesses can be formed during the actual production of the link, and no separate components whatever are required any longer for making up the pivots between adjacent links. Adjacent links in a chain can be press-fitted together in such a short time that the length of time required hitherto for assembling a power-line supporting chain can be reduced to a mere fraction thereof. Moreover, a pair of links can be readily separated by slightly bending apart the corresponding ends of two outer side plates. Thus it becomes possible, for example, for a damaged chain link to be replaced or the length of a chain to be altered within a short period of time. The maintenance of a stock of spare parts is also materially simplified, since the power-line supporting chains, which are very cumbersome because of the limited extent to which the links can be swivelled, need no longer be stored in one piece. Here again, in any case, it is an advantage that no additional parts are required for making up the pivots between links.

Some embodiments of the invention are described below, one feature of which is that those ends of the outer side plates which carry the studs are offset from the ends containing the holes. This ensures that the ends of the outer parts of the side plates, after assembly of the power-line supporting chain, lie throughout in the boundary planes of the chain and that the chain is of uniform width from end to end because those end portions of the side plates which are offset inwardly are always contained between those end portions of the side plates of the next adjacent link which are further spaced apart, i.e. offset outwardly, so that the narrower portions of the links, throughout the chain as a whole, are built up to the same width as the wider portions. Hence, the amount of offset of the plate end portions should preferably be equal to the thickness of the material of the plates.

A desirable feature of the invention is that those faces of the side plates which contain the holes or recesses, as seen from the direction in which the studs are pushed home, should also contain cut-away portions running from the holes to the adjacent edge of the side plate. This enables the studs of one link to be introduced far more easily into the holes in the other link. The cutaway portions may with advantage taper towards the holes. The assembly of two links will also be further facilitated if the depth cut away be reduced as it nears the hole. In this way, as two links are pushed together lengthwise, the end portions of one link will be forced apart and those of the other link will be forced together more easily and in fact almost of their own accord. Then, if the cut-away portion ends right at the edge of the hole, the studs will readily slip or spring into the holes. Another advantage consists in that the cross-section of the side plates will be weakened hardly if at all at the point of stress in the vicinity of the holes.

It is of advantage for the studs to be shaped as cylindrical pins and for the holes to pass fully through the side plates.

Irrespective of whether a cut-away portion be provided adjacent each hole, the forcing together of the end portions of those side plates which are inwardly stepped, as well as the forcing apart of the end portions of those plates which are outwardly stepped, will be facilitated if the studs be sloped or rounded at the front, with respect to the direction of insertion.

Power lines can best be passed through openings in the cross-pieces. However, not only is the cross-piece suitable for securing and accommodating power lines, but it may also well be used to provide a stop-face for the edges of adjacent link plates, so as to limit the swiveling angle between links. This can readily be arranged by adapting the position of the cross-piece to that of the edges of the side plates of the adjacent link. In the production of a chain link, it is desirable for the two end portions of a side plate to be offset from each other where the cross-piece abuts the side plate.

Another possibility, however, is for those end portions of the side plates which bear the studs also to be provided with stops for limiting the swiveling angle.

Those edges of the side plates which come up against a stop may have substantially flat stop faces, which will enable to reduce the pressure per unit surface area as exerted on the stops and edges.

Synthetic material such as a thermoplastic on an ethylene basis is particularly suitable as a material for chain links such as here proposed, especially as the elasticity of the synthetic material greatly assists the bending apart of the link ends. It is also perfectly possible for the links in such a power-line supporting chain to be made of metal, the requisite degree of flexibility still being obtainable in a side plate of adequate tensile strength. When the material chosen is plastics, however, there is the further advantage that a chain link can be made all in one piece.

There are basically two possible ways of constructing a power-line supporting chain in accordance with the invention. Thus, the side plates may carry studs on the outside of one end portion and may contain holes shaped like the studs on the inside of the other end portion. This arrangement may equally well be reversed, so that the side plates carry studs on the inside at one end and contain holes on the outside at the other end for accommodating the studs.

Figure 1:
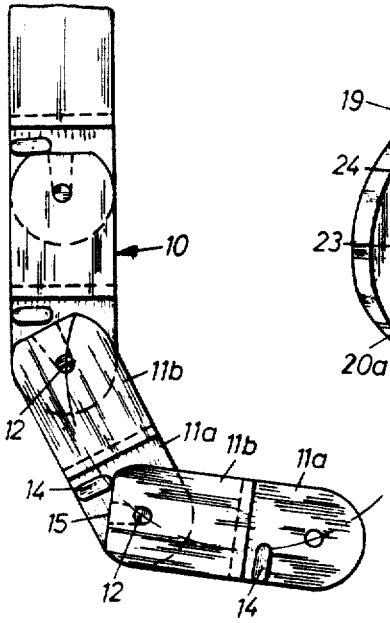
FIG. 1 is a side elevation of part of a power-line supporting chain according to the invention.

Referring now to the drawings in detail, and FIG. 1 thereof in particular, the power-line supporting chain shown in FIG. 1 is made up of a number of links 10, in which the ends 11a of the side plates 11 carry studs 12, while the opposite ends 11b, which are farther spaced apart than the ends 11a, contain corresponding holes 13 (see FIG. 2). The outer faces of the ends 11a of the side plates 11 are also provided with stops 14, while the more widely spaced ends 11b have flattened edge faces 15. When such a chain is bent, each link 10 moves to a given swivel angle in relation to the adjacent link 10 at which the edge face 15 is in contact with the stop 14, but beyond which no further bending of the chain is possible. When the chain is straightened out, however, the other side of each edge face 15 encounters the stop 14, so that the chain cannot be bent the opposite way but becomes self-supporting.

FIG. 2 shows the basic form of link 10 used for the chain illustrated in FIG. 1, except that in the case of the link 10 in FIG. 2 there are not stops 14 on the outer faces of the ends 11a of each plate 11. A cross-piece 16, which serves as a tie for the two side plates 11, here also performs the functions of the stops 14. For this reason, too, the edge face 15 is divided into two parts, 15 is substantially vertical and lies in contact with a cross- at a chosen angle to each other. Part 15a of the edge face 15 is substantially vertical and lies in contact with a cross-piece 16 when the power-line supporting chain is straight. Part 15b of the edge face 15 lies in contact with the cross-piece 16 when the maximum permissible swiveling angle has been reached. From this it follows that the angle between the parts 15a and 15b is governed by the permitted swiveling angle, to which it is supplementary, that is to say makes up 180°.

The front face of the stud 12 is sloped to facilitate assembly of the chain links 10.

The inner faces of the ends 11b of the outer plates 11 contain cut-aways 17, which taper towards the holes 13. The depth of the cut-aways 17 decreases as they approach the holes 13, so that the clearance between opposite pairs of cut-aways 17 decreases likewise and the end portions 11b are forced apart when the end portions 11a carrying the studs 12 of another link 10 are thrust into position.

The cross-piece 16 lies precisely at the point where the end portions 11a are stepped from the ends 11b towards the center of the link 10. The extent of the offset between the ends 11a and 11b is equal to the thickness of the material in a side plate 11, so that the outer faces of all the ends 11b lie in alignment. The cross-piece 16 is provided with an opening 18 through which a power line is passed.

Figure 3:
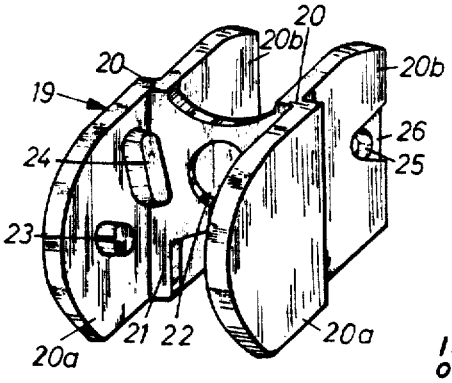
FIG. 3 is an isometric view of another type of link according to the invention.

In the type of chain link 19 shown in FIG. 3, two side plates 20 are tied together by a cross-member 21. This contains an opening 22 for a power line. The ends 20a of the side plates 20 are farther apart than the ends 20b. The inner faces of the ends 20a carry studs 23 and stops 24. The ends 20b of the outer plates 20 contain holes 25 opposite which the outer faces contain cut-aways 26 of the same shape as the cut-aways 17. Thus, when two links 19 are press-fitted together, the ends 20a carrying the studs 23 fit over the ends 20b, the studs 23 sliding along in the cut-aways 26 until they reach and snap home into the holes 25. Here again, it is partly the ends 20b which are forced together and partly the ends 20a which are forced apart.

In any of the forms of link described above, the studs can be made from a material different from that of the remainder of the link, and such studs can be inserted into the links. Moreover, bushes made of a material other than that used for the studs or the remainder of the link, can be set into the holes.

Figure 4:
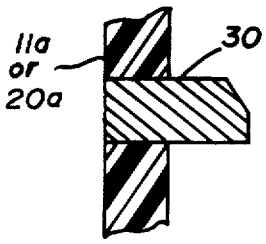
*FIG. 4 is a partial cross-section through a link of the type of FIG. 2 or FIG. 3 showing a modified form of stud according to the invention.*

*Such an arrangement is illustrated in FIG. 4 wherein the arm 11a of FIG. 2 or 20a of FIG. 3 is provided with a separate stud 30, made of steel, for example, which is secured to the arm by conventional means such as a press fit, adhesive, threads or clips.*

It is, of course, to be understood that the present invention is, by no means, limited to the specific showing in the drawing, but also comprises any modifications within the scope of the appended claims.

It may furthermore be added that while the chain links may be made of various types of synthetic material, thermoplastic synthetic material on an ethylene basis has proved very successful. If the cam or stud 12 is made of such thermoplastic synthetic material, the bores 13 may be provided with a bushing of steel. Inversely, if the link is made of steel, the bushing in bore 13 may be made of thermoplastic synthetic material on an ethylene basis.

Figure 5:
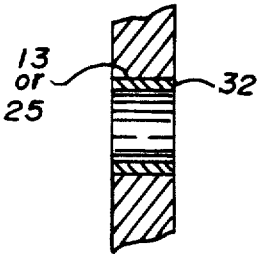
*FIG. 5 is a partial cross-section through a link of the type of FIG. 2 or FIG. 3 showing a bushing in the bore according to the invention.*

*Such an arrangement is shown in FIG. 5 in which the bore 13 of FIG. 2 or 25 of FIG. 3 carries a bushing 32, made of steel, for example, retained in the corresponding arm of the link by conventional means such as a press fit, adhesive or threads.*

What we claim is:

1. A power-line supporting chain for supporting energy conveying means, especially power lines and hoses, which includes a plurality of chain links pivotally connected to each other, each of said links being H-shaped and having two oppositely located and substantially parallel plate-shaped arms [and a transverse] *integrally formed with* wall [transverse] *means extending transversely* to the longitudinal extension of said arms and interconnecting the same at an area between the ends of said arms, *said transverse wall means defining at least one transverse opening in each link adapted to receive energy conveying means for retention between said arms,* each of said arms being laterally elastically yieldable relative to the other arm in a direction transverse to the longitudinal plane of symmetry of the respective link and having two sections connected to each other at the region of said transverse wall [while] *means,* one of said sections of each arm [is] *being* provided with a bore and the pertaining other section of the same arm [is] *being* provided with a stud having an outer diameter corresponding to a slide fit for said bore, said chain links being arranged so that the studs of one chain link pivotally engage the bores of the respective next following link while the bores of said one chain link are pivotally engaged by the studs of the respective next preceding link, the end portion of each side plate which bears the stud being offset from the end portion of the side plate which contains the [hole] *bore.*

2. A chain according to claim 1, in which the two sections of each arm of each link are offset with regard to each other in a direction transverse to the longitudinal plane of symmetry of the respective chain link.

3. A chain according to claim 1, in which those end portions of the arms which contain the bores also contain cut-away portions each of which extends between the respective bore and the adjacent edge of the pertaining arm and provides a guide passage for guiding a stud into the respective bore.

4. A chain according to claim 1, in which the studs are in the form of cylindrical pins, and in which the bores extend fully through the respective arms.

5. A chain according to claim 1, in which the studs are chamfered on their leading sides with respect to the direction in which the link is moved relative to the next adjacent link to be connected therewith.

[6. A chain according to claim 1 in which each transverse wall contains at least one opening through which power lines can be passed.]

7. A chain according to claim 1, in which the two sections of each arm are offset from each other where the transverse wall *means* adjoins the side plate.

8. A chain according to claim 1, in which stops for limiting the swiveling angle between the links are mounted on those ends of the arms which carry the studs.

9. A chain according to claim 1, in which the chain links are made of synthetic material.

[10. A chain according to claim 1, in which each chain link is made in one piece.]

11. A chain according to claim 1, in which each of the chain links is provided with abutment means for limiting the maximum angular position of each two adjacent chain links, and in which each link has a flat end face portion for cooperation with abutment means of the respective adjacent link.

12. A chain for supporting energy conveying means, especially power lines and hoses, which includes a plurality of chain links pivotally connected to each other, each of said links being H-shaped and having two oppositely located and substantially parallel plate-shaped arms and [a transverse] wall [transverse] *means extending transversely* to the longitudinal extension of said arms and interconnecting the same at an area between the ends of said arms, *said transverse wall means defining at least one transverse opening in each link adapted to receive energy conveying means for retention between said arms,* each of said arms being laterally elastically yieldable relative to the other arm in a direction transverse to the longitudinal plane of symmetry of the respective link and having two sections connected to each other at the region of said transverse wall [while] *means,* one of said sections of each arm [is] *being* provided with a bore and the pertaining other section of the same arm [is] *being* provided with a stud having an outer diameter corresponding to a slide fit for said bore, said chain links being arranged so that the studs of one chain link pivotally engage the bores of the respective next following link while the bores of said one chain link are pivotally engaged by the studs of the respective next preceding link, those end portions of the arms which contain the bores also containing cut-away portions each of which extends between the respective bore and the adjacent edge of the pertaining arm and provides a guide passage for guiding a stud into the respective bore, the width of a cut-away tapering towards the corresponding adjacent bore.

13. A chain for supporting energy conveying means, especially power lines and hoses, which includes a plurality of chain links pivotally connected to each other, each of said links being H-shaped and having two oppositely located and substantially parallel plate-shaped arms and [a transverse] wall [transverse] *means extending transversely* to the longitudinal extension of said arms and interconnecting the same at an area between the ends of said arms, *said transverse wall means defining at least one transverse opening in each link adapted to receive energy conveying means for retention between said arms,* each of said arms being laterally elastically yieldable relative to the other arm in a direction transverse to the longitudinal plane of symmetry of the respective link and having two sections connected to each other at the region of said transverse wall [while] *means*, one of said sections of each arm [is] *being* provided with a bore and the pertaining other section of the same arm [is] *being* provided with a stud having an outer diameter corresponding to a slide fit for said bore, said chain links being arranged so that the studs of one chain link pivotally engage the bores of the respective next following link while the bores of said one chain link are pivotally engaged by the studs of the respective next preceding link, those end portions of the arms which contain the bores also containing cut-away portions each of which extends between the respective bore and the adjacent edge of the pertaining arm and provides a guide passage for guiding a stud into the respective bore, the depth of a cut-away decreasing with decreasing distance from the edge of the pertaining bore.

14. A chain according to claim 13, in which each cut-away terminates at the edge of the adjacent bore.

15. A power-line supporting chain for supporting energy conveying means, especially power lines and hoses, which includes a plurality of chain links pivotally connected to each other, each of said links being H-shaped and having two oppositely located and substantially parallel plate-shaped arms and [a transverse] wall [transverse] *means extending transversely* to the longitudinal extension of said arms and interconnecting the same at an area between the ends of said arms, *said transverse wall means defining at least one transverse opening in each link adapted to receive energy conveying means for retention between said arms*, each of said arms being laterally elastically yieldable relative to the other arm in a direction transverse to the longitudinal plane of symmetry of the respective link and having two sections connected to each other at the region of said transverse wall [while] *means*, one of said sections of each arm [is] *being* provided with a bore and the pertaining other section of the same arm [is] *being* provided with a stud having an outer diameter corresponding to a slide fit for said bore, said chain links being arranged so that the studs of one chain link pivotally engage the bores of the respective next following link while the bores of said one chain link are pivotally engaged by the studs of the respective next preceding link, the transverse wall *means* of a chain link serving as a stop-face for the edge face of an adjacent chain link so as to limit the swiveling angle between the links.

[16. A chain for supporting energy conveying means, especially power lines and hoses, which includes a plurality of chain links pivotally connected to each other, each of said links being H-shaped and having two oppositely located and substantially parallel plate-shaped arms and a transverse wall transverse to the longitudinal extension of said arms and interconnecting the same at an area between the ends of said arms, each of said arms being laterally elastically yieldable relative to the other arm in a direction transverse to the longitudinal plane of symmetry of the respective link and having two sections connected to each other at the region of said transverse wall, while one of said sections of each arm is provided with a bore and the pertaining other section of the same arm is provided with a stud having an outer diameter corresponding to a slide fit for said bore, said chain links being arranged so that the studs of one chain link pivotally engage the bores of the respective next following link while the bores of said one chain link are pivotally engaged by the studs of the respective next preceding link, the studs being made of a material different from the material of the chain links and being inserted into the latter.]

[17. A chain for supporting energy conveying means, especially power lines and hoses, which includes a plurality of chain links pivotally connected to each other, each of said links being H-shaped and having two oppositely located and substantially parallel plate-shaped arms and a transverse wall transverse to the longitudinal extension of said arms and interconnecting the same at an area between the ends of said arms, each of said arms being laterally elastically yieldable relative to the other arm in a direction transverse to the longitudinal plane of symmetry of the respective link and having two sections connected to each other at the region of said transverse wall, while one of said sections of each arm is provided with a bore and the pertaining other section of the same arm is provided with a stud having an outer diameter corresponding to a slide fit for said bore, said chain links being arranged so that the studs of one chain link pivotally engage the bores of the respective next following link while the bores of said one chain link are pivotally engaged by the studs of the respective next preceding link, and bushes made of a material other than that used for the studs and set into the bores of the respective link arm sections.]

18. A [chain] link *for a power-line supporting chain* for supporting energy conveying means, especially power lines and hoses, which includes two oppositely located substantially parallel and laterally elastically yieldable plate-shaped arms and [a transverse] wall [transverse] *means extending transversely* to the longitudinal extension of said arms, *said transverse wall means interconnecting said arms at an area between the ends of said arms and defining at least one transverse opening in said link adapted to receive energy conveying means for retention between said arms*, each of said arms having two sections offset with regard to each other where said transverse wall adjoins said two sections and in a direction transverse to the longitudinal plane of symmetry of the chain link, so that the distance between one pair of opposite arm sections is less than the distance between the other pair of opposite arm sections, one pair of opposite arm sections being provided with axially aligned holes and the other pair of opposite arm sections being provided with studs corresponding in diameter to a slide fit in said holes.

*19. The link of claim 18 wherein said arms, said transverse wall means and said studs are integrally formed of the same material.*

*20. The link of claim 18 wherein said arms and said transverse wall means are integrally formed of the same material and said studs are separately made of a different material.*

*21. The link of claim 18 wherein said arms and said transverse wall means are integrally formed of the same material and wherein bushings made of a different material are set into the bores of the respective link arm sections.*

*22. A power-line supporting chain for supporting energy conveying means, especially power lines and hoses, which includes a plurality of chain links pivotally connected to each other, each of said links being H-shaped and having two oppositely located and substantially parallel plate-shaped arms and wall means extending transversely to the longitudinal extension of said arms and interconnecting the same at an area between the ends of said arms, said transverse wall means defining at least one transverse opening in each link adapted to receive energy conveying means for retention between said arms, each of said arms having*

*two sections connected to each other at the region of said transverse wall means, one of said sections of each arm being provided with a bore and the pertaining other section of the same arm being provided with a stud having an outer diameter corresponding to a slide fit for said bore, each of said sections of said arms being laterally elastically yieldable in a direction transverse to the longitudinal plane of symmetry of the respective link to an extent such that the said sections of the arms provided with bores on one link and the said sections of the arms provided with studs on a following link may be flexed relative to each other to enable entry of the studs into the bores, said chain links being arranged so that the studs of one chain link pivotally engage the bores of the respective next following link while the bores of said one chain link are pivotally engaged by the studs of the respective next preceding link, the end portion of each side plate which bears the stud being offset from the end portion of the side plate which contains the bore.*

*23. The chain of claim 22 in which each of the sections of the arms provided with a bore also includes a cut-away portion extending between the bore and the adjacent edge of the arm section which provides a guide passage for guiding a stud into the respective bore.*

*24. The chain of claim 23 in which the width of said cut-away portion tapers inwardly from the edge of the arm sections toward the bore.*

*25. The chain of claim 23 in which the depth of the cut-away portion decreases with decreasing distance from the edge of the bore.*

* * * * *